United States Patent Office 3,336,420
Patented Aug. 15, 1967

3,336,420
PROCESS FOR THE PRODUCTION OF ASYMMETRIC THIONOTHIOL-PHOSPHORIC ACID ESTERS
Reimer Cölln, Wuppertal-Elberfeld, Gerhard Schrader, Wuppertal-Cronenberg, and Günter Unterstenhöfer, Opladen, Germany, assignors to Farbenfabriken Bayer Aktiengesellschaft, Leverkusen, Germany, a corporation of Germany
No Drawing. Filed Dec. 29, 1964, Ser. No. 422,042
Claims priority, application Germany, Jan. 4, 1964,
F 41,675
7 Claims. (Cl. 260—948)

The present invention relates to asymmetric thionothiol-phosphoric acid esters, and to a process for their production, and to new compositions containing the same as well as methods of using such esters to combat pests, and more particularly the present invention relates to esters of the foregoing type and a process for the production of such asymmetric thionothiol-phosphoric acid esters of the general formula

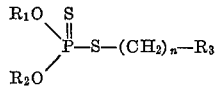
$$\begin{array}{c}R_1O\\ \diagdown\\ R_2O\end{array}\!\!\!\!\!\!\overset{S}{\underset{}{\parallel}}\!\!P\text{—S—}(CH_2)_n\text{—}R_3 \qquad (I)$$

in which $R_1$ stands for a linear alkyl radical and $R_2$ stands for a branched alkyl radical or a cycloalkyl radical, while $R_3$ represents an alkylmercapto, arylmercapto, haloarylmercapto, N-alkylaminocarbonyl or N,N-dialkylaminocarbonyl radical, and the index $n$ has the value of 1 or 2.

The symbol $R_1$ preferably denotes linear lower alkyl groups with 1 to 4 carbon atoms, such as the methyl or ethyl radical; $R_2$ stands for branched alkyl radicals, with preferably 3 to 6 carbon atoms, for example the isopropyl, sec.- and tert.-butyl, pinacolyl and cyclohexyl radicals.

The radical $R_3$ chiefly represents lower alkylmercapto groups. As examples there may be mentioned the methyl-, ethyl-, propyl- and butylmercapto radicals, but $R_3$ can also denote a phenylmercapto or halo-(preferably chloro-) phenylmercapto radical or a lower N-alkylaminocarbonyl group, for example the N-methyl-, N-ethyl-, N-isopropyl-, N-allyl-aminocarbonyl radical or the corresponding N,N-dialkyl-aminocarbonyl radicals.

It is an object of the present invention to provide organic asymmetric thionothiol-phosphoric acid esters of the foregoing type and a process for their production.

It is a further object of the present invention to provide such asymmetric phosphoric acid esters which are useful for pest control purposes, these compounds possessing outstanding pesticidal and especially insecticidal and acaricidal properties.

It is a still further object of the present invention to provide pesticidal compounds and compositions containing the instant asymmetric phosphoric acid esters which may be used effectively to control pests on plant crops.

It is a still further object of the present invention to provide asymmetric phosphoric acid esters of the foregoing type which have a comparatively high thermal stability as well as a comparatively low solubility in water resulting in a reduced phytotoxicity.

It is a still further object of the present invention to provide a process for the production of such asymmetric phosphoric acid esters starting from asymmetric O,O-dialkyl- or O-alkyl-O-cycloalkyl - thionothiol - phosphoric acids and halo-lower alkyl compounds, such as halo-lower alkyl thioalkyl ethers, halo-lower alkyl thioaryl ethers, halo-lower alkyl thio halo-aryl ethers, halo-lower alkyl-acyl-N-alkylamides, halo-lower alkyl-acyl-N,N-dialkyl-amides, and the like.

It is a still further object of the present invention to provide a method of controlling pests, and especially insects and acarids, which contemplates applying thereto and to the habitats, in pesticidal amounts, asymmetric phosphoric acid esters derived in accordance with the foregoing.

Other and further objects of the invention will become apparent from a study of the within specification and accompanying examples.

It has been found, in accordance with the present invention, that compounds of the above mentioned general formula are obtained in a smooth reaction and with good yields by reacting asymmetric O,O-dialkyl- or O-alkyl-O-cycloalkyl-thionothiol-phosphoric acids of the general formula

$$\begin{array}{c}R_1O\\ \diagdown\\ R_2O\end{array}\!\!\!\!\!\!\overset{S}{\underset{}{\parallel}}\!\!P\text{—SH} \qquad (II)$$

in the form of their salts or in the presence of acid-binding agents, with compounds of the structure

$$\text{Hal—}(CH_2)_n\text{—}R_3 \qquad (III)$$

containing alkyl halide groups.

In the preceding formulae, the symbols $R_1$, $R_2$, $R_3$ and $n$ have the meaning stated above, while Hal stands for a halogen atom.

The reaction according to the invention is preferably carried out in the presence of inert organic solvents. Lower aliphatic ketones and nitriles, such as acetone, methyl ethyl ketone, methyl isopropyl ketone and methyl isobutyl ketone as well as acetonitrile and propionitrile, have proved particularly satisfactory for this purpose, but also aromatic hydrocarbons, such as mononuclear aryl hydrocarbons, for example benzene, toluene or xylene.

It has further proved expedient to carry out the process according to the present invention at a slightly to moderately elevated temperature (30 to 100° C., preferably 40 to 80° C.) and also to continue stirring the reaction mixture, after the starting components have been combined, for some time (e.g. 1 to 3 hours), possibly while heating at the stated temperatures. In this case the products of the present process are obtained with an excellent degree of purity and in especially good yields.

The asymmetric O,O-dialkyl- or O-alkyl-O-cycloalkyl-thionothiol-phosphoric acids to be used as starting materials for the reaction according to the invention can be prepared by known methods (cf., for example, G. Schrader "Die Entwicklung neuer insektizider Phosphorsäureester," 3rd edition, Verlag Chemie, 1963, page 112, or U.S. Patent No. 2,983,644) in the following manner:

A mixture of 2 mols each of a linear aliphatic alcohol and a branched aliphatic or a cycloaliphatic alcohol is stirred at room temperature or slightly elevated temperature with 1 mol of phosphorus pentasulfide. The mixture of the desired asymmetric thionothiol-phosphoric acid and the two corresponding symmetric homologues formed in the course of 5 to 10 hours, is subsequently separated by fractional washing out of the water-soluble components or by removal of the component of stronger acidic reaction by means of a deficient amount of alkali. The salts of the asymmetric O,O-dialkyl- or O-alkyl-O-cyclo-alkyl-thionothiol-phosphoric acids, which can be obtained easily by this method also on an industrial scale, are sufficiently pure for further reaction according to the present invention. The corresponding alkali metal and ammonium salts are used preferably.

The halo-lower alkyl compounds are readily available and include, for instance:

Halo lower alkyl thio alkyl ethers and especially thio lower alkyl ethers, such as halo-$C_1$–$C_2$ lower alkyl thio $C_1$–$C_4$ lower alkyl ethers, including chloromethyl-, bromomethyl-, thio-methyl-, ethyl-, -propyl-, and -butylethers, as well as β-chloroethyl-, β-bromoethyl-, thiomethyl-, -ethyl-, -propyl-, and -butyl-ethers;

Halo lower alkyl thio aryl ethers and especially thio mononuclear aryl ethers, such as halo-$C_1$-$C_2$ lower alkyl thio mononuclear aryl ethers having 6 ring carbon atoms, including chloromethyl-, bromomethyl-, thio-phenyl-, etc. ethers, as well as β-chloro-ethyl-, β-bromoethyl-, ethyl-thio-phenyl-, etc. ethers;

The corresponding thio halo aryl ethers, such as the halo-$C_1$-$C_2$ lower alkyl thio halo aryl ethers having 6 ring carbon atoms, including chloromethyl-, bromomethyl-, thio-chlorophenyl-, bromo-phenyl-, iodo-phenyl-, and -fluorophenyl-ethers, as well as β-chloroethyl-, β-bromoethyl-, thio-chlorophenyl-, bromophenyl-, iodophenyl-, and -fluorophenyl-ethers;

Halo lower alkyl acyl-N-alkylamides, and especially acyl-N-lower alkylamides such as halo-$C_1$-$C_2$ lower alkyl carbonyl-N-$C_1$-$C_4$-lower alkylamides, including halo alkanoyl-N-lower alkylamides and particularly chloro-aceto-, bromo-aceto-N-methyl-, -ethyl-, -propyl-, and -butyl-amides as well as γ-chloropropionyl-, γ-bromopropionyl-, N-methyl-, -ethyl-, -propyl-, and -butyl-amides;

And the corresponding di-alkylamides, such as -N-$C_1$-$C_4$-di-lower alkylamides including chloro-aceto-, bromo-aceto-, N,N-dimethyl-, -diethyl-, -dipropyl-, -dibutyl-, methyl-ethyl-, methyl-propyl, methyl-butyl, ethyl-propyl-, ethyl-butyl-, propyl-butyl-, etc. amides, as well as γ-chloropropionyl-, γ-bromopropionyl-, N,N-dimethyl-, -diethyl-, -dipropyl-, dibutyl-, methyl-ethyl-, methyl-propyl-, methyl-butyl-, ethyl-propyl-, ethyl-butyl-, propyl-butyl-, etc. amides.

The products of the present process are usually viscous, slightly yellow, water-insoluble oils, some of which are distillable. Those substances which cannot be distilled without decomposition, even in a high vacuum, can be freed from the last volatile components by heating them at a slightly elevated temperature (50 to 80° C.) under strongly reduced pressure (1 to 2 mm. Hg), and thus be obtained in the pure state. Some of the compounds which can be produced according to the present process, however, are obtained in crystalline form. In this case they can be further purified by recrystallization from the customary solvents or solvent mixtures, such as benzene, ligroin, etc.

The asymmetric thionothiol-phosphoric acid esters obtainable according to the present invention are distinguished by outstanding biological, e.g., pesticidal, especially insecticidal and acaricidal, properties. They are equally effective against pest insects of various kinds, such as spider mites, aphids, grain weevils and caterpillars. The products, moreover, possess a low water-solubility resulting in a reduced phytotoxicity. Finally, they exhibit a substantially high thermal stability. The maximum biological effect, e.g., pesticidal effect, is achieved with the O-methyl-O-branched-alkyl compounds, and among these especially with the O-methyl-O-isopropyl derivatives.

On account of their outstanding pesticidal properties, their low water-solubility, and their comparatively high thermal stability, the asymmetric products of the present invention are useful as pest control agents and/or plant protective agents.

It will be appreciated from the foregoing that a process for the production of asymmetric thionothiol-phosphoric acid esters of the instant type may now be provided which is efficient and which produces the instant compounds in excellent yields as well as in an especially high degree of purity, the process comprising reacting a member selected from the group consisting of asymmetric O,O-dialkyl- and O - alkyl - O - cycloalkyl - thionothiol - phosphoric acid, having the general formula

         (IV)

in which $R_1$ is a linear alkyl radical, and $R_2$ is selected from the group consisting of a branched alkyl radical and a cycloalkyl radical, in the presence of an acid binding agent, with a halo-lower alkyl compound having the general formula $$R_3—(CH_2)_n—Hal \qquad (V)$$

in which $R_3$ is selected from the group consisting of alkylmercapto, arylmercapto, haloarylmercapto, N-alkylaminocarbonyl, and N,N-dialkylaminocarbonyl radicals, Hal is a halogen radical, and $n$ is an integer having a value of 1–2, to form the corresponding asymmetric thionothiol-phosphoric acid ester of the formula

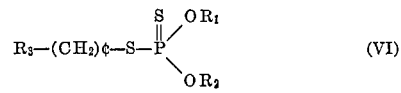         (VI)

in which $R_1$, $R_2$, $R_3$ and $n$ have the foregoing meaning.

The reaction is carried out preferably at temperatures substantially between about 30–100° C., and of course such reaction may be effected with the corresponding phosphoric acid salt, in which case the presence of an acid binding agent is not required.

Among the corresponding phosphoric acid salts which may be used are the alkali salts, such as the sodium, potassium, lithium and ammonium salts, the term alkali salt as used herein, i.e., both in the specification and claims, defining both the alkali metal salts and the ammonium salt.

The acid binding agents which may be used herein, where the free acid rather than the corresponding acid salt is used as starting material, include alkali metal hydroxides, such as sodium hydroxide, potassium hydroxide, and lithium hydroxide, alkali metal carbonates, such as sodium carbonate, potassium carbonate, and lithium carbonate, alkali metal bicarbonates, such as sodium bicarbonate, potassium bicarbonate, and lithium bicarbonate, and corresponding ammonium compounds, such as ammonium hydroxide, ammonium carbonate, and ammonium bicarbonate, as well as tertiary alkylamines, such as triethylamine, diethylmonomethylamine, tripropylamine, dimethylcyclohexylamine, etc. Thus $C_1$-$C_6$ tri-lower alkylamines having various straight and branched chain substituents may be used, including the substituents methyl, ethyl, n-propyl, isopropyl, n-butyl, isobutyl, sec.-butyl, tert.-butyl, the amyls, and the hexyls, as well as $C_5$-$C_6$ cyclo-lower alkyl substituted amines, including the substituents cyclopentyl, cyclohexyl, etc., and the corresponding mixed dialkyl and monocycloalkyl substituted- and monoalkyl and dicycloalkyl substituted-amines, wherein the alkyl substituent or substituents and the cycloalkyl substituent or substituents include the foregoing substituents.

The instant process may be carried out preferably in the presence of an inert solvent selected from the group consisting of lower aliphatic ketones, lower aliphatic nitriles, and aromatic hydrocarbons, etc. Thus, the lower aliphatic ketone solvents contemplated include especially di-lower alkyl ketones, for example, $C_3$-$C_9$ di-lower alkyl ketones, such as acetone, methylethyl ketone, di-ethyl ketone, methylisopropyl ketone, methylisobutyl ketone, di-isobutyl ketone, and the like, whereas the lower aliphatic nitriles contemplated include especially lower alkane nitriles, for example, $C_1$-$C_4$ lower alkyl cyanides, such as acetonitrile, propionitrile, butyronitrile, and the like. Furthermore, the aromatic hydrocarbons include especially mononuclear aryl hydrocarbons, including mono- and di-lower alkyl substituted mononuclear aryl hydrocarbons, such as benzene, toluene, xylene, and the like.

The starting halo lower alkyl compound which may be used should be of the type noted above, whereas the starting asymmetric O,O-dialkyl- or O-alkyl-O-cycloalkyl-thionothiol-phosphoric acids which may be used should include those having the foregoing formula in which $R_1$ is a straight chain alkyl radical, preferably a $C_1$–$C_4$ straight chain lower alkyl radical, such as ethyl, methyl, n-propyl, and n-butyl radicals, and in which $R_2$ is a branched chain alkyl radical, preferably a $C_3$–$C_6$ branched chain lower alkyl radical, such as isopropyl, isobutyl, sec.butyl, tert.butyl, isoamyl, tert.amyl, isohexyl, pinacolyl, etc., or a cycloalkyl radical, preferably a $C_5$–$C_6$ cyclo-lower alkyl or lower cycloalkyl radical, such as cyclopentyl and cyclohexyl radials, etc.

Because of the distinguishing properties of the instant compounds, the same may be used as pesticides, especially insecticides and acaricides which have a comparatively high thermal stability and a comparatively low solubility in water, rendering them useful in application on plant crops due to the inherent reduced phytotoxicity of these compounds.

Specifically, the instant compounds may be used per se or in the form of compositions with an inert dispersible carrier vehicle for applying to plant crops. Thus, the present invention contemplates further a method of combating pests which comprises applying to such pests and their habitat a pesticidal amount of a compound of the instant type.

The substances to be used according to the present invention can either be used as such, as the artisan will appreciate, or they may be combined with solid or liquid extenders or diluents customary for pesticides, i.e., carrier vehicles. Examples of such formulations with carrier vehicles are those with emulsifiable concentrates, spray powders, pastes, soluble powders, dusting agents and granulates. The production of such formulations is carried out in a known manner (compare, for example, Agricultural Chemicals, March 1960, pp. 35–38). Suitable dispersible liquid carrier vehicles or auxiliaries are mainly: solvents, such as, optionally halogenated, e.g., chlorinated, aromatic hydrocarbons (e.g., xylene, benzene, chlorobenzenes), paraffins (for example, petroleum fractions), ether, alcohols (for example, methanol, ethanol, butanol), and amines (such as, ethanolamine or dimethyl formamide); whereas suitable finely divided solid carrier vehicles are, for example: natural or synthetic rock meals or powders (such as kaolin, chalk, i.e., calcium carbonate, alumina, talcum, highly disperse silicic acid and silicates, e.g., alkali silicates). Also, liquid emulsifiers, such as non-ionic and anionic emulsifiers (for example, polyoxy-ethylene-fatty acid esters, and polyoxyethylene-fatty alcohols ethers, alkyl- and aryl-sulfonates), especially magnesium stearate, sodium oleate, etc., may be used, as well as dispersing agents, for example, lignin, sulfite waste liquors and methyl cellulose.

As will be appreciated, the active compounds used according to the instant invention may be present in such formulations in mixture with one another and with other known active substances.

The particular thionothiol-phosphoric acid esters in accordance with the present invention may be applied advantageously in the form of a mixture with a major amount of the inert finely divided dispersible solid or inert dispersible liquid as carrier vehicle, the instant acid ester being present, for example, in an amount of from about 0.1 to 95% by weight of the active compound, the remainder being the carrier vehicle. Nevertheless, the active compound may be used in a concentration of from about 5 to 0.0005%, especially where the preparation is applied by spraying, dusting, sprinkling, atomizing, etc. The instant compounds used alone or in admixture with a carrier vehicle of the foregoing type are especially effective against spider mites, grain weevils, aphids, caterpillars, etc., as for example, in concentrations of from about 0.01 to 0.0001%. Such preparations may be applied onto plant crops infested with pests, and especially with insects and acarids of the foregoing types.

In particular, asymmetric thionothiol-phosphoric acid esters contemplated herein include those of the formula (VII)

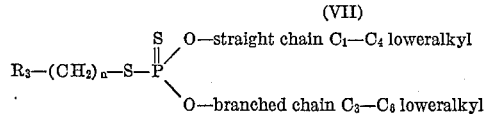

as well as those of the formula (VIII)

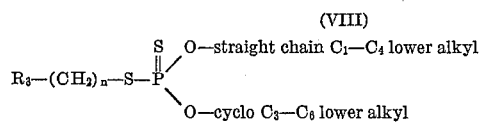

in which $R_3$ is selected from the group consisting of alkylmercapto, arylmercapto, haloarymercapto, N-alkylaminocarbonyl, and N,N-dialkylaminocarbonyl radicals, and $n$ is an integer having a value of 1–2.

The term linear alkyl and/or linear alkyl radical as used herein, i.e., both in the specification and claims, contemplates normal straight chain, carbon chains, such as $C_1$–$C_{12}$ (methyl to dodecyl) alkyl chains, including especially $C_1$–$C_4$ (methyl to butyl) lower alkyl chains. Representative of the linear alkyl groups contemplated herein are, for example, methyl, ethyl, n-propyl, n-butyl, n-amyl, n-hexyl, n-heptyl, n-octyl, n-nonyl, n-decyl, n-undecyl, n-dodecyl, etc., i.e., those radicals derived from the paraffin series, including methane, ethane, propane, n-butane, n-pentane through n-dodecane, etc.

The term branched alkyl and/or branched alkyl radical as used herein, i.e., both in the specification and claims, contemplates branched carbon chains, such as $C_3$–$C_{12}$ (isopropyl to branched dodecyl) branched alkyl chains, including especially $C_3$–$C_6$ (isopropyl to branched hexyl), branched lower alkyl chains. Among the branched substituents which may be included are $C_1$–$C_6$ (methyl to hexyl) lower alkyl side chains which may be normal or branched, i.e., substituted with further lower alkyl groups ($C_1$–$C_4$). Representative of the branched alkyl groups contemplated herein are, for example, isopropyl, isobutyl, sec.-butyl, tert.-butyl, isoamyl, tert.-amyl, isohexyl, pinacolyl, etc., i.e., those radicals derived from the branched chain paraffin series, including propane, isobutane (2-methyl propane), isopentane (2-methyl butane), tert.-pentane (2,2-dimethyl propane), 2-methyl pentane, 3-methyl pentane, 2,2-dimethyl butane, 2,3-dimethyl butane, etc., 2-methyl hexane, 3-methyl hexane, 2,2-dimethyl pentane, 2,3-dimethyl pentane, 2,4-dimethyl pentane, 3,3-dimethyl pentane, 3-ethyl pentane, 2,2,3-trimethyl butane, etc., the corresponding branched octanes, nonanes, decanes, undecanes, dodecanes, etc.

The term cycloalkyl and/or cycloalkyl radical as used herein, i.e. both in the specification and claims, contemplates substituted and unsubstituted aliphatic cyclic carbon chains, such as $C_3$–$C_8$ (cyclopentyl to cyclooctyl) cycloalkyl chains, especially cyclo lower radicals ($C_3$–$C_6$), and incuding those radicals in which the replaceable hydrogen atom is located on an open alkyl chain substituent attached to a ring carbon atom of the cyclic moiety. Among the substituents which may be included on the ring are $C_1$–$C_6$ (methyl to hexyl) lower alkyl chains which may be normal or branched, i.e. substituted with further lower alkyl groups ($C_1$–$C_4$). Representative of the cycloalkyl groups contemplated herein are, for example, cyclopentyl, cyclohexyl, cycloheptyl.

The term aryl or aryl radical as used herein, i.e. both in the specification and claims, contemplates mononuclear and dinuclear aryl radicals, such as phenyl and naphthyl radicals, whereas the term halo-aryl or halo-aryl radical as used herein, i.e., both in the specification and claims, contemplates halo-substituted mononuclear and dinuclear aryl radicals, such as chlorophenyl, bromophenyl, iodophenyl, fluorophenyl, and the corresponding di- and tri-halo-substituted phenyl radicals, as well as chloronaphthyl, bromonaphthyl, iodonaphthyl, and fluoronaphthyl, and the corresponding di- and tri-halo-substituted naphthyl radicals.

The term linear lower alkyl and/or linear lower alkyl radical as used herein, i.e., both in the specification and claims, contemplates straight chain $C_1$–$C_4$ lower alkyl chains, such as methyl, ethyl, n-propyl and n-butyl, whereas the term branched chain lower alkyl and/or branched chain lower alkyl radical as used herein, i.e., both in the specification and claims, contemplates branched $C_3$–$C_6$ lower alkyl chains, such as isopropyl, isobutyl, sec.-butyl, tert.-butyl, isoamyl, tert.-amyl, 2-methylamyl, 3-methylamyl, 2,2-dimethylbutyl, 2,3-dimethylbutyl, isohexyl, pinacolyl (1,2,2-trimethylpropyl), etc.

The term cyclo-lower alkyl and/or lower cycloalkyl as used herein, i.e., both in the specification and claims, contemplates substituted and unsubstituted alicyclic saturated rings, including lower alkyl ($C_1$–$C_4$) substituted saturated rings such as cyclopentyl, cyclohexyl, methyl cyclohexyl, dimethyl cyclohexyl, trimethyl cyclohexyl, ethyl cyclohexyl, diethyl cyclohexy, n-propyl cyclohexyl, isopropyl cyclohexyl, n-butyl cyclohexyl isobutyl cyclohexyl, sec. butyl cyclohexyl, tert. butyl cyclohexyl, etc.

The following examples are given for the purpose of illustrating the present invention.

*Example 1*

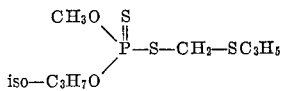

105 grams (0.5 mol) of O-methyl-O-isopropyl-thionothiol-phosphoric acid sodium salt are dissolved in 400 cc. of acetonitrile. 55 grams of chloromethyl thioethyl ether are added to this solution at 40 to 50° C., the reaction mixture is subsequently further stirred for one hour, then cooled to room temperature and poured into 400 cc. of ice water. The separated oil is taken up with 300 cc. of benzene, the benzene solution is washed with water until the reaction is neutral, and dried over sodium sulfate. By subsequent fractional distillation and after evaporation of the solvent, there are obtained 87 g. (67% of the theoretical) of O-methyl-O-isopropyl-S-(ethylmercapto-methyl)-thionothiol-phosphoric acid ester of B.P. 19° C./0.01 mm. Hg.

The mean toxicity ($LD_{50}$) of the compound on rats per os is 5 mg. per kg. animal weight.

Spider mites are still killed to the extent of 70% by 0.0001% solutions.

*Example 2*

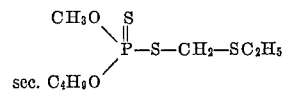

111 grams (0.5 mol) of O-methyl-O-sec. butyl-thionothiol-phosphoric acid sodium salt are dissolved in 400 cc. of acetonitrile, 55 g. of chloromethyl thioethyl ether are added to this solution at 30 to 40° C., while stirring, the reaction mixture is subsequently further stirred at 40° C. for one hour and then worked up as described in the preceding example. 112 grams (82% of the theoretical) of O-methyl-O-sec. butyl-S-(ethylmercaptomethyl)-thionothiol-phosphoric acid ester of B.P. 94° C./0.01 mm. Hg are obtained.

On rates per os the compound has a mean toxicity ($LD_{50}$) of 10 mg. per kg. animal weight.

Grain weevils are still killed to the extent of 100% by 0.0001% solutions of the preparation.

*Example 3*

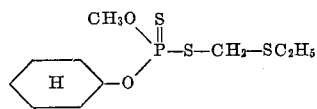

55 grams of chloromethyl thioethyl ether are added at 30 to 40° C., while stirring, to a solution of 124 g. (0.5 mol) of O-methyl - O - cyclohexyl-thionothiol-phosphoric acid sodium salt in 400 cc. of acetonitrile, the mixture is subsequently further stirred at 40° C. for 2 hours, and then cooled to room temperature. The reaction mixture is then poured into 400 cc. of ice water, the separated oil is taken up with 300 cc. of benzene, and the resulting benzene solution is washed with water until the reaction is neutral and then dried over sodium sulfate. After distilling off the solvent, the residue is heated for a short time under a pressure of 1 mm. Hg at a bath temperature of 70° C. The O-methyl-O-cyclohexyl-S-(ethylmercaptomethyl)-thionothiol-phosphoric acid ester is obtained in this way in the form of a pale yellow water-insoluble oil. The yield is 118 g. (79% of the theoretical).

*Analysis.*—Calculated for molecular weight 300: S, 32.0%; P, 10.3%. Found: S, 31.0%; P, 10.7%.

The mean toxicity ($LD_{50}$) of the compound on rats per os is 25 mg. per kg. animal weight.

Spider mites are killed to the extent of 40% by 0.001% solutions of the product.

*Example 4*

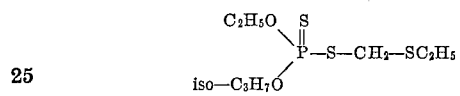

112 grams (0.5 mol) of O-ethyl-O-isopropyl-thionothiol-phosphoric acid sodium salt are dissolved in 400 cc. of acetonitrile. 56 grams of chloromethyl thioethyl ether are added to the resultant solution at 40° C., while stirring, and the mixture is subsequently further stirred at 40° C. for one hour, and then worked up as described in Example 1. 108 grams (79% of the theoretical) of O-ethyl - O - isopropyl - S - (ethylmercapto - methyl)-thionothiol-phosphoric acid ester of B.P. 87° C./0.01 mm. Hg are obtained.

The mean toxicity ($LD_{50}$) of the compound on rats per os is 5 mg. per kg. animal weight.

Spider mites are killed to the extent of 100% and 0.001% solutions.

*Example 5*

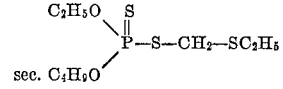

A solution of 120 g. (0.5 mol) of O-ethyl-O-sec.butyl-thionothiol-phosphoric acid sodium salt in 400 cc. of acetonitrile is treated at 40° C., while stirring, with 55 g. of chloromethyl thioethyl ether. When the addition is completed, the mixture is stirred at the stated temperature for one hour and worked up as repeatedly described (see Example 1), 108 g. (75% of the theoretical) of O-ethyl - O - sec. butyl - S - (ethylmercapto - methyl)-thionothiol-phosphoric acid ester of B.P. 94° C./0.01 mm. Hg being obtained.

On rats per os the compound has a mean toxicity ($LD_{50}$) of 5 mg. per kg. animal weight.

Spider mites are killed to the extent of 100% and aphids still to the extent of 80% by 0.001% solutions of the compound.

*Example 6*

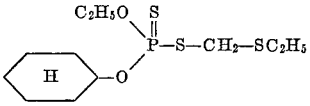

135 grams (0.5 mol) of O-ethyl-O-cyclohexylthionothiol-phosphoric acid sodium salt are dissolved in 400 cc. of acetonitrile. 55 grams of chloromethyl thioethyl ether are added to this solution at 40° C., while stirring, the reaction mixture is subsequently further stirred at the stated temperature for one hour then cooled to room temperature and poured into 400 cc. of ice water. The separated oil is taken up with 300 cc. of benzene, the benzene solution washed with water, dried over sodium sulfate and the solvent is finally distilled off in a vacuum. The residue is heated for a short time under a pressure of 1 mm. Hg at a bath temperature of 65° C., and the O-ethyl-O - cyclohexyl - S - (ethylmercapto - methyl) - thionothiol-phosphoric acid ester is thus obtained as a yellow water-insoluble oil. The yield is 128 g. (82% of the theoretical).

*Analysis.*—Calculated for molecular weight 314: P, 9.9%; S, 30.6%. Found: P, 10.4%; S, 30.3%.

On rats per os the mean toxicity ($LD_{50}$) of the compound is 5 mg. per kg. animal weight.

Caterpillars are still killed to the extent of 100% by 0.01% solutions of the preparation.

*Example 7*

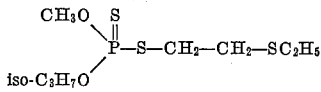

105 grams (0.5 mol) of O-methyl-O-isopropyl-thionothiol-phosphoric acid sodium salt are dissolved in 400 cc. of acetonitrile, 63 g. of 2-chloroethyl thioethyl ether are added to the resultant solution at 70 to 80° C., while stirring, the mixture is subsequently further stirred at 80° C. for one hour and then cooled to room temperature. The reaction mixture is subsequently poured into 400 cc. of ice water, the separated oil is taken up with 300 cc. of benzene, and the benzene solution is washed with water and dried over sodium sulfate. By subsequent fractional distillation of the organic phase and after evaporation of the solvent, there are obtained 89 g. (65% of the theoretical) of O-methyl-O-isopropyl-S-(2-ethylmercaptoethyl)-thionothiol-phosphoric acid ester of B.P. 88° C./0.01 mm. Hg.

The mean toxicity ($LD_{50}$) of the compound on rats per os is 10 mg. per kg. animal weight.

Aphids are killed to the extent of 100% by 0.001% solutions and spider mites still to the extent of 40% by 0.0001% solutions of the product.

*Example 8*

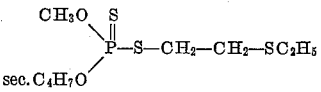

111 grams (0.5 mol) of O-methyl-O-sec.butyl-thionothiol-phosphoric acid sodium salt are dissolved in 400 cc. of acetonitrile. 63 grams of 2-chloroethyl thioethyl ether are added to this solution at 70° C., while stirring, and the mixture is subsequently further stirred at 80° C. for one hour and then worked up as described in Example 7. 113 grams (78% of the theoretical) of O-methyl-O-sec.butyl-S - (2 - ethylmercapto - ethyl) - thionothiol - phosphoric acid ester of B.P. 92° C./0.01 mm. Hg are obtained.

The mean toxicity ($LD_{50}$) of the compound on rats per os is 20 mg. per kg. animal weight.

Spider mites are still killed to the extent of 90% by 0.001% solutions and caterpillars are destroyed to the extent of 100% by 0.01% solutions of the preparation.

*Example 9*

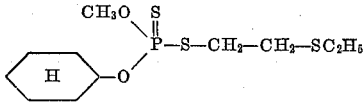

63 grams of 2-chloroethyl thioethyl ether are added at 75° C., while stirring, to a solution of 124 g. (0.5 mol) of O-methyl-O-cyclohexyl-thionothiol-phosphoric acid sodium salt in 400 cc. of acetonitrile, the mixture is further heated at 80° C. for one hour, then cooled to room temperature and diluted with 400 cc. of ice water. The separated oil is subsequently taken up with 300 cc. of benzene, the benzene solution is washed with water, dried over sodium sulfate and the solvent distilled off in a vacuum. The residue is heated for a short time under a pressure of 1 mm. Hg at a bath temperature of 70° C., and the O-methyl-O-cyclohexyl-S-(2-ethylmercapto-ethyl)-thionothiol-phosphoric acid ester is thus obtained in the form of a yellow water-insoluble oil. The yield is 120 g. (76% of the theoretical).

*Analysis.*—Calculated for molecular weight 314: S, 30.6%; P, 9.9%. Found: S, 30.2%; P, 10.6%.

On rats per os the compound has a mean toxicity ($LD_{50}$) of about 60 mg. per kg. animal weight.

Spider mites are killed to the extent of 100% by 0.01% solutions of the product.

*Example 10*

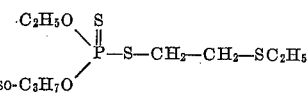

112 grams (0.5 mol) of O-ethyl-O-isopropyl-thionothiol-phosphoric acid sodium salt are dissolved in 400 cc. of acetonitrile. 63 grams of 2-chloroethyl thioethyl ether are added to this solution at 75° C., while stirring, and the reaction mixture is subsequently further heated at 75° C. for one hour and then worked up as described in Example 9. 121 grams (84% of the theoretical) of O-ethyl-O-isopropyl - S - (2 - ethylmercapto - ethyl) - thionothiolphosphoric acid ester of B.P. 92° C./0.01 mm. Hg are thus obtained.

The mean toxicity ($LD_{50}$) of the product on rats per os is 10 mg. per kg. animal weight.

Aphids are killed to the extent of 50%, spider mites to the extent of 80%, by 0.001% solutions of the compound.

*Example 11*

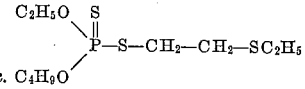

A solution of 120 g. (0.5 mol) of O-ethyl-O-sec.butyl-thionothiol-phosphoric acid sodium salt in 400 cc. of acetonitrile is treated at 75° C., while stirring, with 63 g. of 2-chloroethyl thioethyl ether, and the mixture is subsequently heated at 75° C. for one hour and then worked up as repeatedly described (see Example 10). 119 grams (79% of the theoretical) of O-ethyl-O-sec.butyl-S-(2-ethyl-mercapto-ethyl)-thionothiol-phosphoric acid ester of B.P. 103° C./0.01 mm. Hg are thus obtained.

The mean toxicity ($LD_{50}$) of the compound on rats per os is 20 mg. per kg. animal weight.

Spider mites are killed to the extent of 100% by 0.01% solutions of the product.

*Example 12*

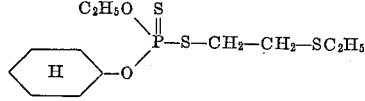

135 grams (0.5 mol) of O-ethyl-O-cyclohexyl-thionothiol-phosphoric acid sodium salt are dissolved in 400 cc. of acetonitrile, 63 g. of 2-chloroethyl thioethyl ether are added to the resultant solution at 80° C., and the reaction mixture is stirred at 80° C. for one hour, then cooled to room temperature and diluted with 400 cc. of ice water. The separated oil is taken up with 300 cc. of benzene, the benzene solution washed with water and dried over sodium sulfate. After distilling off the solvent, the residue is heated for a short time under a pressure of 1 mm. Hg at a bath temperature of 70° C. In this way, the O-ethyl-O-cyclohexyl - S - (2 - ethylmercapto - ethyl) - thionothiolphosphoric acid ester is obtained as a yellow water-insoluble oil. The yield is 128 g. (78% of the theoretical).

*Analysis.*—Calculated for molecular weight 328: P, 95.%; S, 29.3%. Found: P, 10.1%; S, 28.9%.

On rats per os the compound has a mean toxicity ($LD_{50}$) of 50 mg. per kg. animal weight.

Aphids are destroyed to the extent of 100% by 0.01% solutions of the preparation.

Example 13

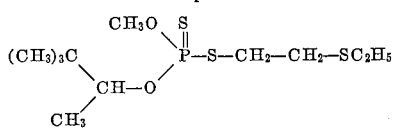

38 grams of 2-chloroethyl thioethyl ether are added at 60° C. to a solution of 75 g. (0.3 mol) of O-methyl-O-pinacolyl-thionothiol-phosphoric acid sodium salt in 200 cc. of acetonitrile, the reaction mixture is further heated at 70 to 80° C. for one hour, then cooled to room temperature and poured into 200 cc. of ice water. The separated oil is taken up with 200 cc. of benzene, the benzene solution is washed with water, dried over sodium sulfate and the solvent distilled off in a vacuum. The remaining residue is heated for a short time under a pressure of 1 mm. Hg at a batch temperature of 70° C., and 83 g. (87% of the theoretical) of O-methyl-O-pinacolyl-S - (2 - ethylmercapto - ethyl) - thionothiol - phosphoric acid ester are thus obtained in the form of a yellow water-insoluble oil.

*Analysis.*—Calculated for molecular weight 316: P, 9.2%; S, 30.4%. Found: P, 10.0%; S, 30.2%.

The mean toxicity of the compound ($LD_{50}$) on rats per os amounts to 10 mg. per kg. animal weight. Larvae of flies are completely killed 0.01% solutions and even 20% by 0.001% solutions of the compound. Caterpillars of the type *Plutella maculipennis* are completely destroyed by 0.1% solutions and are even killed 70% by 0.01% solutions of the ester. Aphids are completely destroyed by 0.001% solutions of the compound.

Example 14

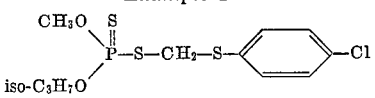

105 grams (0.5 mol) of O-methyl-O-isopropyl-thionothiol-phosphoric acid sodium salt are dissolved in 400 cc. of acetonitrile. 96 grams of chloromethyl-(4-chlorophenyl)-thioether dissolved in 50 cc. of acetonitrile are added to this solution at 50 to 70° C., while stirring, the reaction mixture is subsequently further heated at 70° C. for one hour, then cooled to room temperature and poured into 400 cc. of ice water. The separated oil is taken up with 300 cc. of benzene, the benzene solution is washed with water and then dried over sodium sulfate. After distilling off the solvent in a vacuum, the remaining residue is heated for a short time under a pressure of 2 mm. Hg at a batch temperature of 60° C. 129 grams (75% of the theoretical) of O-methyl-O-isopropyl-S-(4-chlorophenylmercapto-methyl) - thionothiol - phosphoric acid ester are obtained in this way as a yellow water-insoluble oil.

*Analysis.*—Calculated for molecular weight 343: Cl, 10.3%; S, 28.0%; P, 9.1%. Found: Cl, 10.0%; S, 28.1%; P, 10.2%.

The mean toxicity ($LD_{50}$) of the compound on rats per os is 25 mg. per kg. animal weight.

Spider mites are killed to the extent of 95% by 0.001% solutions of the product.

Example 15

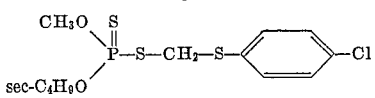

A solution of 112 g. (0.5 mol) of O-methyl-O-sec. butyl-thionothiol-phosphoric acid sodium salt in 400 cc. of acetonitrile is treated at 50 to 60° C., while stirring, with 97 g. of chloromethyl-(4-chlorophenyl)-thioether. The mixture is subsequently heated at 80° C. for one hour, then cooled to room temperature and worked up as described in the preceding example. The O-methyl-O-sec.butyl - S - (4 - chlorophenylmercaptomethyl)-thionothiol-phosphoric acid ester is obtained in the form of a yellow water-insoluble oil. The yield is 127 g. (71% of the theoretical).

*Analysis.*—Calculated for molecular weight 357: P, 8.7%; S, 26.9%; Cl, 9.9%. Found: P, 8.8%; S, 26.4%; Cl, 9.8%.

The mean toxicity ($LD_{50}$) of the compound on rats per os is 25 mg. per kg. animal weight.

Spider mites are still destroyed to the extent of 80% by 0.001% solutions of the preparation.

Example 16

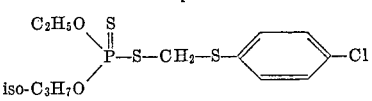

112 grams (0.5 mol) of O-ethyl-O-isopropyl-thionothiol-phosphoric acid sodium salt are dissolved in 400 cc. of acetonitrile, 97 g. of chloromethyl-(4-chlorophenyl) thio-ether are added to this solution at 50 to 60° C., the reaction mixture is subsequently further heated at the stated temperature for one hour and then worked up as repeatedly described (see Example 15). 170 grams (95% of the theoretical) of O-ethyl-O-isopropyl-S-(4-chlorophenylmercapto-methyl) - thionothiol - phosphoric acid ester are thus obtained in the form of a pale yellow water-insoluble oil.

*Analysis.*—Calculated for molecular weight 357: Cl, 10.0%; S, 26.9%; P, 8.8%. Found: Cl, 10.1%; S, 26.4%; P, 9.1%.

On rats per os the product has a mean toxicity ($LD_{50}$) of 20 mg. per kg. animal weight.

Spider mites are killed to the extent of 100% by 0.001% solutions of the compound.

Example 17

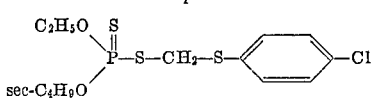

120 grams (0.5 mol) of O-ethyl-O-sec.butyl-thionothiol-phosphoric acid sodium salt are dissolved in 400 cc. of acetonitrile. This solution is treated at 70° C., while stirring, with 97 g. of chloromethyl-(4-chlorophenyl) thioether, the mixture is subsequently further heated at 60 to 70° C. for one hour and then worked up in the manner described in the preceding example. The O-ethyl-O - sec.butyl - S - (4 - chlorophenyl - mercapto-methyl)-thionothiol-phosphoric acid ester is thus obtained in the form of a pale yellow water-insoluble oil. The yield is 145 g. (78% of the theoretical).

*Analysis.*—Calculated for molecular weight 371: P, 8.4%; S, 25.9%; Cl, 9.6%. Found: P, 8.9%; S, 25.9%; Cl, 9.5%.

The mean toxicity ($LD_{50}$) of the compound on rats per os is 25 mg. per kg. animal weight.

Spider mites are still killed to the extent of 60% by 0.001% solutions of the product.

Example 18

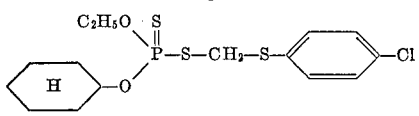

97 grams of chloromethyl-(4-chlorophenyl) thioether are added at 60 to 70° C. to a solution of 135 g. (0.5 mol) of O - ethyl - O - cyclohexyl-thionothiol-phosphoric acid sodium salt in 400 cc. of acetonitrile, the reaction mixture is subsequently further stirred at 60° C. for one hour, then worked up in the manner repeatedly described, and 148 g. (75% of the theoretical) of O-ethyl-O-cyclohexyl - S - (4-chlorophenylmercapto-methyl)-thionothiol-phosphoric acid ester are thus obtained as a yellow water-insoluble oil.

*Analysis.*—Calculated for molecular weight 397: Cl, 9.0%; S, 24.2%; P, 7.8%. Found: Cl, 9.0%; S, 23.9%; P, 8.3%.

The mean toxicity (LD$_{50}$) of the compound on rats per os is 50 mg. per kg. animal weight.

Spider mites are still destroyed to the extent of 40% by 0.001% solutions of the preparation.

*Example 19*

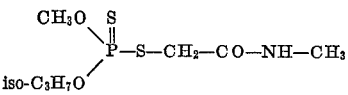

A solution of 104 g. (0.5 mol) of O-methyl-O-isopropyl-thionothiol-phosphoric acid sodium salt in 200 cc. of acetonitrile is treated at 50 to 60° C., while stirring, with 54 g. of monochloroacetic acid-N-methylamide, and the mixture is subsequently further heated at 80° C. for one hour. The reaction mixture is then cooled to room temperature and diluted with 200 cc. of ice water. The separated oil is taken up with 150 cc. of benzene, the benzene solution is washed with water and dried over sodium sulfate. After distilling off the solvent, the residue solidifies in crystalline form. By recrystallization from ligroin, the O-methyl-O-isopropyl-S-(N-methylcarbaminylmethyl)-thionothiol-phosphoric acid ester is obtained in the form of white needles of melting point 56 to 58° C. The yield is 63 g. (49% of the theoretical).

On rats per os the mean toxicity (LD$_{50}$) of the compound is 5 mg. per kg. animal weight. Resistant spider mites as well as aphids are completely destroyed by 0.01% solutions of the ester.

*Example 20*

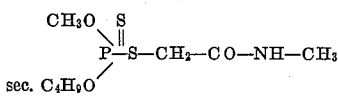

111 grams (0.5 mol) of O-methyl-O-sec.butyl-thionothiol-phosphoric acid sodium salt are dissolved in 400 cc. of acetonitrile, 54 g. of monochloroacetic acid-N-methylamide dissolved in 50 cc. of acetonitrile are added to this solution at 65° C., while stirring, the reaction mixture is subseqnently further heated at 80° C. for one hour and then worked up as described in Example 19. The remaining oily residue is heated for a short time under a pressure of 1 mm. Hg at a bath temperature of 70 C. 72 grams (72% of the theoretical) of O-methyl-O-sec.butyl - S - (N-methylcarbaminyl-methyl)-thionothiol-phosphoric acid ester are obtained in this way in the form of a viscous water-insoluble oil.

*Analysis.*—Calculated for molecular weight 271: N, 5.1%; P, 11.5%; S, 23.6%. Found: N, 4.9%; P, 12.0%; S, 23.6%.

The mean toxicity (LD$_{50}$) of the compound on rats per os is 10 mg. per kg. animal weight. Spider mites are killed to the extent of 85% by 0.001% solutions of the preparation.

*Example 21*

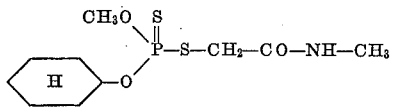

A solution of 124 g. (0.5 mol) of O-methyl-O-cyclohexyl-thionothiol-phosphoric acid sodium salt in 300 cc. of acetonitrile is treated, while stirring, with 54 g. of monochloroacetic acid-N-methylamide dissolved in 100 cc. of acetonitrile. The reaction mixture is subsequently heated at 60° C. for one hour and then diluted with 300 cc. of ice water. The separated oil is taken up with 200 cc. of benzene, the benzene solution is washed with water and dried over sodium sulfate. After distilling off the solvent, the residue crystallizes. By recrystallization from ethyl acetate, 81 g. (55% of the theoretical) of O-methyl - O - cyclohexyl-S-(N-methylcarbamyl-methyl)-thionothiol-phosphoric acid ester are obtained in the form of white needles of M.P. 122° C.

*Analysis.*—Calculated for molecular weight 297: N, 4.7%; S, 21.6%; P, 10.4%. Found: N, 4.68%; S, 21.55%; P, 10.3%.

The mean toxicity of the compound on rats per os amounts to 300 mg. per kg. animal weight.

Each of the foregoing examples is repeated, using the corresponding potassium and ammonium phosphoric acid ester salts, as the case may be, as well as the corresponding O,O-dialkyl-, or O-alkyl-O-cycloalkyl thionothiol free phosphoric acids in the presence of an acid binding agent, and similar results are obtained. Such examples are again repeated, using the corresponding bromo lower alkyl thio ethers, and similar results are also obtained. Furthermore, such examples are repeated, using chloro-methyl-phenyl thio ether, bromo-methyl-phenyl thio ether, the corresponding bromoethyl-thio ethers, as well as the corresponding monochloro-, bromo-, acetic and propionic acid-N,N-dimethyl-, diethyl-, dipropyl-, dibutyl-, methylethyl, methylpropyl-, and methylbutyl-amides, and similar results are obtained.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Asymmetric thionothiol phosphoric acid esters of the formula

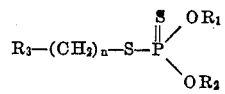

in which R$_1$ is a linear alkyl radical, R$_2$ is selected from the group consisting of a branched alkyl radical and a cycloalkyl radical having 5 to 6 ring carbon atoms, R$_3$ is an alkylmercapto radical when R$_2$ is a branched alkyl radical and R$_3$ is selected from the group consisting of arylmercapto and monohaloarylmercapto radicals when R$_2$ is a cycloalkyl radical, and $n$ is an integer having a value of 1-2.

2. Asymmetric thionothiol phosphoric acid esters of the formula

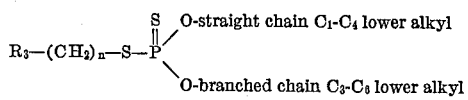

in which R$_3$ is an alkylmercapto radical and $n$ is an integer having a value of 1-2.

3. Asymmetric thionothiol phosphoric acid esters of the formula

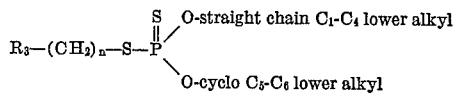

in which R$_3$ is selected from the group consisting of arylmercapto and haloarylmercapto radicals and $n$ is an integer having a value of 1-2.

4. Asymmetric thionothiol phosphoric acid esters of the formula

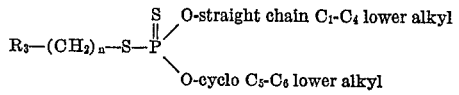

in which R$_3$ is selected from the group consisting of aryl-mercapto and mono-haloarylmercapto radicals and $n$ is an integer having a value of 1-2.

5. O-methyl-O-isopropyl - S - (ethylmercapto-methyl)-thionothiol phosphoric acid ester.

6. O-ethyl-O-isopropyl-S - (ethylmercapto - methyl)thionothiol phosphoric acid ester.

7. O-methyl-O-isopropyl - S - (2-ethylmercapto ethyl)-thionothiol phosphoric acid ester.

(References on following page)

References Cited

UNITED STATES PATENTS

| | | | |
|---|---|---|---|
| 2,494,283 | 1/1950 | Cassaday et al. | 260—943 |
| 2,596,076 | 5/1952 | Hook et al. | 260—948 X |
| 2,759,010 | 8/1956 | Lorenz et al. | 260—948 |
| 2,793,224 | 5/1957 | Fancher | 260—949 X |
| 2,891,984 | 6/1959 | Gatzi et al. | 260—979 X |
| 2,968,591 | 1/1961 | Tracy | 167—22 |
| 3,080,274 | 3/1963 | Legator et al. | 167—22 |
| 3,134,801 | 5/1964 | Sehring et al. | 260—943 |
| 3,210,397 | 10/1965 | Young | 260—979 |

CHARLES B. PARKER, *Primary Examiner.*

RICHARD L. RAYMOND, *Assistant Examiner.*

UNITED STATES PATENT OFFICE
CERTIFICATE OF CORRECTION

Patent No. 3,336,420                          August 15, 1967

Reimer Cölln et al.

It is hereby certified that error appears in the above numbered patent requiring correction and that the said Letters Patent should read as corrected below.

Column 4, lines 15 to 20, the formula should appear as shown below instead of as in the patent:

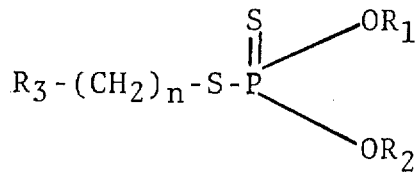

column 7, line 43, for "19° C." read -- 79° C. --; column 10, line 71, for "95%" read -- 9.5% --; column 11, line 17, for "batch" read -- bath --; line 23, for "9.2%" read -- 9.8% --.

Signed and sealed this 6th day of August 1968.

(SEAL)
Attest:

EDWARD M. FLETCHER, JR.                    EDWARD J. BRENNER
Attesting Officer                               Commissioner of Patents